Patented Oct. 16, 1923.

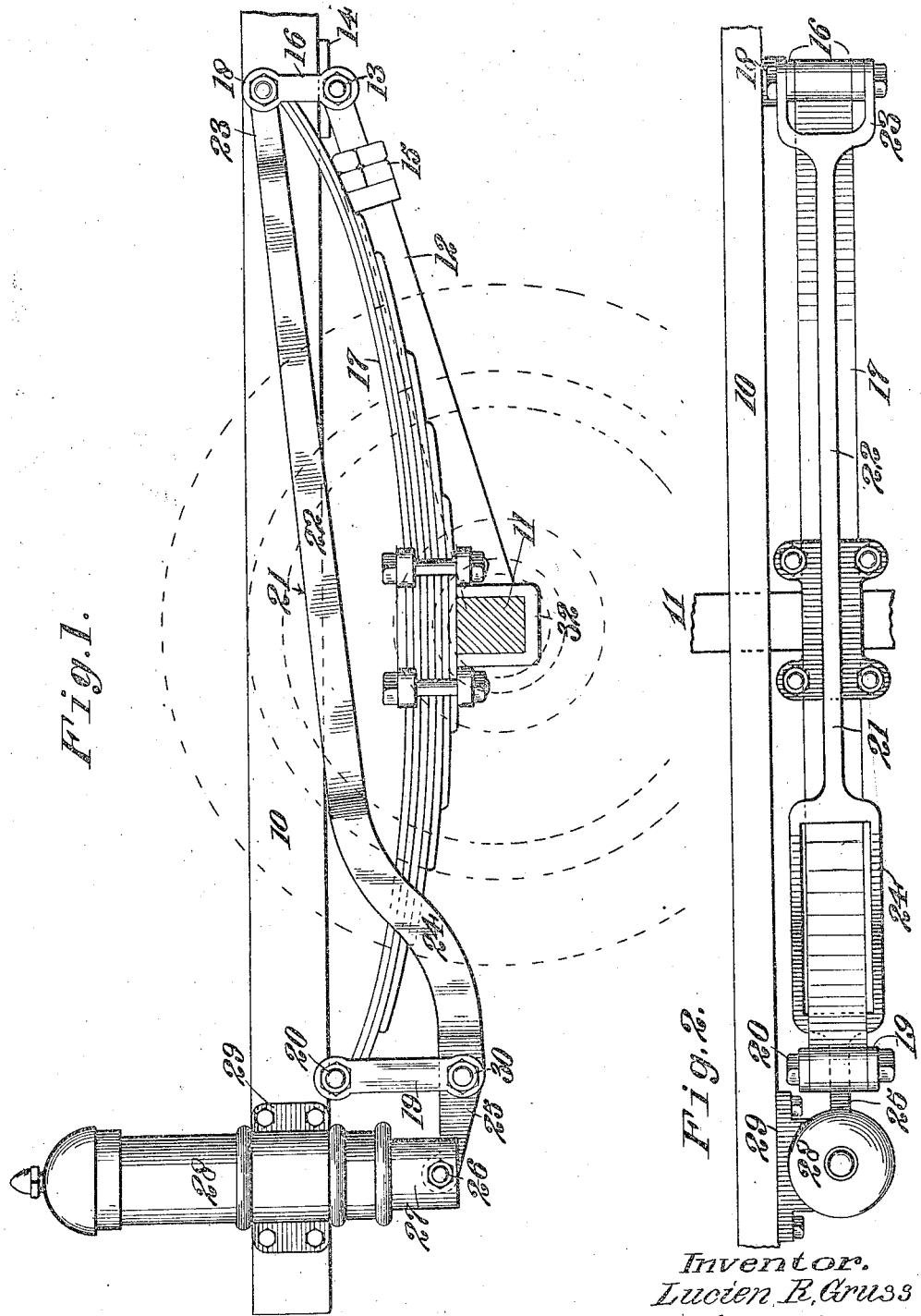

1,470,972

UNITED STATES PATENT OFFICE.

LUCIEN R. GRUSS, OF SAN FRANCISCO, CALIFORNIA, ASSIGNOR TO PNEUMATIC CUSHION CO., OF SAN FRANCISCO, CALIFORNIA, A CORPORATION OF ARIZONA.

VEHICLE FRAME SUSPENSION.

Application filed August 27, 1919. Serial No. 320,228.

*To all whom it may concern:*

Be it known that I, LUCIEN R. GRUSS, a citizen of the United States, residing at the city and county of San Francisco and State of California, have invented new and useful Improvement in Vehicle Frame Suspensions, of which the following is a specification.

This invention relates to a vehicle construction and particularly pertains to a frame suspension therefor.

It is the principal object of the present invention to adapt heavy vehicles, like trucks, to the use of pneumatic cushioning means, such as indicated in my Patent No. 1,216,254, dated February 13th, 1917; the present invention providing novel means whereby the cooperative action of the spring and the cushioning member may be utilized to absorb all major and minor road shocks delivered from the running gear to the vehicle.

The present invention contemplates the use, with the usual steel vehicle springs, of an equalizer bar operatively connected by their rear ends to the movable member of an air spring and pivotally connected by their forward ends to the shackle bolt, by which the springs are secured to the front spring shackles; said equalizer bar having no other connection with the running gear than that afforded by the aforesaid shackle connection with spring so that the vibrations of the running gear are not accentuated as is the case were the lever connected to the running gear.

The invention is illustrated, by way of example, in the accompanying drawings, in which—

Fig. 1 is a fragmentary view in side elevation, showing the vehicle main frame, an axle therebeneath and the running gear, and cushioning means interposed between the axle and the frame.

Fig. 2 is a fragmentary view in plan, showing the frame suspension.

Referring more particularly to the drawings, 10 indicates a vehicle main frame which is disposed above an axle 11 of a suitable running gear. The axle is provided with wheels, as indicated by dotted lines in Fig. 1 and is free to float, as limited by radius rods 12. These rods are pivotally disposed around the body of the axle at their one ends and are pivotally connected to the main frame by bolts 13 at their opposite ends. The bolts 13 are mounted within brackets 14 secured to the under-face of the frame side rails. Radius rods are here shown as formed in two parts which telescope and are threaded one within the other and may be adjusted as regard their length, by means of lock members 15. The bolts 13 also carry spring shackles 16. These shackles are spaced in relation to each other and stand upon the opposite sides of semi-elliptical springs 17. The forward ends of the springs 17 terminate at points above the bolts 13 and are there engaged by spring bolts 18 which pass through the eyes of the springs and hold the shackles 16 in vertical disposed relations. The rear ends of the springs 17 are provided with shackles 19 dependent therefrom by bolts 20. The lower ends of shackles 19 are secured to equalizer bars 21. One of these bars is particularly shown in Fig. 2 and is there seen to comprise a body portion 22 formed at its forward end with the fork 23, which extends along the opposite sides of the shackle links 16 and is secured in pivotal relation thereto by the shackle bolts 18. The body portion 22 of the bar 21 extends longitudinally of springs 17 and is in central alignment therewith. Its rear portion is formed with an enlarged eye 24 through which the rear end of the springs 17 extend. A lever extension 25 forms the terminating end of the bar 21 and is held by a bolt 26 to the movable member 27 of a pneumatic cushion spring 28. The fixed member of this spring is rigidly secured to the main frame 10 by means of a bracket 29. This spring is preferably of the type referred to in the foregoing specification and is designed to act upon both strokes of the member 27 to cushion the action of the equalizer bar 21.

In operation, the vehicle is assembled and the springs 17 secured upon the axle by means of spring seats 32. The equalizer bars and pneumatic cushions are then disposed in the assembled relation shown in Fig. 1 and the vehicle is in condition for use. As the vehicle passes along the roadway, any relative movement of the axle 11 in relation to the main frame 10 will cause deflection of the springs 17. When the axle moves upwardly it will follow an arcuate path on account of the radius rods 12. The springs 17 will thereupon be deflected in the usual way. This relative movement as between the metal springs and the main frame will be transmitted to the air springs through the shackles 19 and equalizer bar 24. The shackle 16 will permit whatever longitudinal movement may be required on the part of the equalizer bar in order to prevent binding.

It will thus be seen that the frame suspension here provided will allow a resilient support of a main frame upon a vehicle running gear and at the same time will provide a pneumatic cushion for absorbing excessive strains and overcoming objectionable rebound which would be produced by the resilient support under ordinary conditions.

Having thus described my invention, what I claim and desire to secure by Letters Patent is:

1. In combination with the frame and axle of a vehicle, a leaf spring carried by said axle, shackle links connecting the forward end of said leaf spring with the main frame, an equalizer bar pivotally connected to the forward end of the leaf spring at the point of its connection with the shackle links, a telescopic cushion device carried by the main frame and to which the rear end of the equalizer bar is pivotally connected, and linkage connecting the rear end of the leaf spring with the equalizer bar at a point intermediate its end.

2. In combination with a main frame and an axle a telescopic air-spring carried upon the main frame, a leaf spring carried by the axle, a radius rod connecting the axle to the main frame, a shackle connection between the forward end of the spring and the main frame, an equalizer bar pivotally connected to the leaf spring at its forward end and to the telescopic air-cushion at its rear end and shackle plates connecting the rear end of the spring with the equalizer bar at a point intermediate the pivotally connected ends of said bar.

3. In combination with a frame and an axle, a leaf spring carried by the axle, a telescopic air-cushion carried by the main frame, an equalizer bar pivotally secured to the forward end of the spring at one end and to the movable member of the telescopic cushion by its other end, shackle members dependent from the forward end of the leaf spring and connecting said spring with the main frame and shackle members dependent from the rear end of the leaf spring and connecting with the equalizer bar at a point intermediate its ends.

4. In combination with a frame and an axle, a leaf spring carried by the axle, a telescopic air-cushion carried by the main frame, an equalizer bar pivotally secured to the forward end of the spring at one end and to the movable member of the telescopic cushion by its other end, shackle members dependent from the forward end of the leaf spring and connecting said spring with the main frame and shackle members dependent from the rear end of the leaf spring and connecting with the equalizer bar at a point intermediate its ends, and a radius rod pivotally connecting the axle to the main frame.

5. The combination with a frame and axle of a vehicle and a semi-elliptical leaf spring carried on the axle and having a shackle connection at one end with the frame of a telescopic cushion device, one member of which is connected to the frame, an equalizer bar connected at one end to the remaining member of the cushioning device, said bar overlapping the leaf spring and extending to the opposite end of the latter and directly pivoted thereto, a pendent link connection between the bar and the end of the spring adjacent to the cushioning device.

6. The combination with a frame and axle of a vehicle and a semi-elliptical leaf spring interposed between, of a telescopic cushioning device, one member of which is fixed to the frame and an equalizer bar, pivotally connected at one end to the remaining cushioning device and extending the full length of the leaf spring to the opposite end thereof and a connection between each end of the leaf spring and the equalizer bar.

In testimony whereof I have hereunto set my hand in the presence of two subscribing witnesses.

LUCIEN R. GRUSS.

Witnesses:
W. W. HEALEY,
W. E. EWING.